United States Patent [19]

Takeuchi et al.

[11] Patent Number: 5,180,617
[45] Date of Patent: Jan. 19, 1993

[54] INTERIOR FINISHING PANEL FOR A VEHICLE AND A METHOD FOR PRODUCING THE SAME

[75] Inventors: Yasuo Takeuchi; Mutsuo Fujii; Hideo Soejima, all of Hiroshima, Japan

[73] Assignee: Nishikawa Kaisei Co., Ltd., Hiroshima, Japan

[21] Appl. No.: 879,196

[22] Filed: May 6, 1992

[30] Foreign Application Priority Data

Jul. 31, 1991 [JP] Japan .................................. 3-191572
Aug. 29, 1991 [JP] Japan .................................. 3-218323

[51] Int. Cl.⁵ .............................................. B32B 3/02
[52] U.S. Cl. ..................................... 428/71; 264/46.5;
428/159; 428/160; 428/174; 428/304.4;
428/309.9; 428/316.6
[58] Field of Search ................ 428/71, 159, 160, 174,
428/304.4, 309.9, 316.6; 264/46.5

[56] References Cited

U.S. PATENT DOCUMENTS

| 4,214,788 | 7/1980 | Srock .................... 296/39.1 |
| 4,347,276 | 8/1982 | Weber et al. ............. 428/309.9 |
| 4,455,338 | 6/1984 | Henne .................... 428/304.4 |
| 4,572,856 | 2/1986 | Gembinski ............... 428/309.9 |
| 4,753,836 | 6/1988 | Mizell ..................... 428/71 |
| 4,791,019 | 12/1988 | Ohta et al. ............... 428/304.4 |
| 5,053,271 | 10/1991 | Mori et al. .............. 428/316.6 |

FOREIGN PATENT DOCUMENTS 2002675  2/1979  United Kingdom ............ 428/309.9

Primary Examiner—William J. Van Balen
Attorney, Agent, or Firm—Sixbey, Friedman, Leedom & Ferguson

[57] ABSTRACT

A porous sheet material is inserted into a back side of a foam base material at a convex section and forces a mat-shaped fiber reinforcing material set in a mold toward a facing material during molding. Alternatively, an impregnated sheet material is inserted between the facing material and the fiber reinforcing material at the convex section so that a molding material for the foam base material is impregnated into the impregnated sheet material during molding. Further, a concave section is molded on the back side of the foam base material at the convex portion by a mold projecting section of the mold. That is, the fiber reinforcing material set in the mold is forced toward the facing material by the mold projecting section during molding.

5 Claims, 9 Drawing Sheets

INTERIOR FINISHING PANEL FOR A VEHICLE AND A METHOD FOR PRODUCING THE SAME

BACKGROUND OF THE INVENTION

1. Field of the Invention

The present invention relates to an interior finishing panel for a vehicle and a method for producing the same. More particularly, it pertains to insert measures for a fiber reinforcing material.

2. Description of the Prior Art

Generally, an interior finishing panel for a vehicle such as door trims and instrument panels is so constructed that a foam base material such as hard urethane foam is integrally molded on the back side of a facing material. Such an interior finishing panel is known and is disclosed in Japanese Utility Model Laid Open Publication No. 58-92041 and Japanese Patent Publication No. 57-46737 wherein a mat-shaped fiber reinforcing material of glass fiber is inserted into the foam base material for improvement in rigidity.

However, in the above-described interior finishing panel wherein the fiber reinforcing material is inserted into the foam base material, if there is a convex section on a surface of the panel, the fiber reinforcing material set in a mold will get caught between an upper mold element (upper die) and a lower mold element (lower die) of the mold during a molding process and then lift at the back side of the convex section. For this reason, as shown in FIG. 12, at a convex section b of an interior finishing panel a, a fiber reinforcing material d, inserted into a foam base material c, is unevenly distributed in a direction away from a facing material e to form a thick portion g of resin layers between the facing material e and the fiber reinforcing material d.

In the above condition, if a molding material such as hard urethane foam used for molding the foam base material c is fed onto the fiber reinforcing material d, the supply of a molding material is impaired by the fiber reinforcing material d. Therefore, the amount of the molding material corresponding to the volume of the thick portion g will not be fed, resulting in a short supply of the molding material. Owing to this short supply, air is entrapped in the thick portion g, leading to the problem that a void f is most likely to occur.

Accordingly, in the event that the void f occurs between the facing material e and the fiber reinforcing material d, the void expands as the temperature of a vehicle compartment rises during the summer or other similar conditions. Thereafter, the facing material e expands, which spoils the appearance of panels and further leads to peeling of the facing material e. In view of this, it is preferable to prevent the fiber reinforcing material d from being unevenly distributed in a direction away from the facing material e.

In order to avoid such an uneven distribution, there has been proposed one type of interior finishing panel as disclosed in Japanese Patent Laid Open Publication No. 63-99912 wherein a fiber reinforcing material is attached to the back side of a facing material by bonding the fiber reinforcing material to the back side of the facing material during a molding process.

However, in the event of the above interior finishing panel, the bonding process, including the application and drying of adhesives, for bonding the facing material to the fiber reinforcing material is time-consuming. Thus, there arises such a drawback that the whole molding time is considerably lengthened.

SUMMARY OF THE INVENTION

The invention is made to overcome the above drawback. It is therefore a principal object of the invention to avoid the occurrence of voids, resulted from the uneven distribution of fiber reinforcing materials, at a convex section and also to positively avoid expansion and peeling of the facing material without prolonging molding time to a greater extent.

To accomplish the above object in relation to a vehicle interior finishing panel having a convex portion and so constructed that a foam base material into which a mat-shaped fiber reinforcing material is inserted is integrally molded on the back side of a facing material, a first solving means of the present invention is characterized in that a porous sheet material which forces the fiber reinforcing material set in a mold toward, or in a direction of the facing material during a molding process is integrally inserted into the back side of the foam base material at the convex section.

A second solving means of the invention is characterized in that an impregnated sheet into which a molding material used for molding the foam base material is impregnated during a molding process is integrally inserted between the facing material and the fiber reinforcing material at the convex section.

A third solving means of the invention is characterized in that a concave section is molded on the back side of the foam base material at the convex section by a mold projecting section which forces the fiber reinforcing material set in the mold toward the facing material during a molding process. In this case, it is preferable to mold a plurality of concave section on the back side of the foam base material at determined spaced intervals and along the convex section.

The third solving means will undergo the following producing steps. In the first place, the pre-molded facing material is set on the molding surface of a lower mold element (lower die). And the mat-shaped fiber reinforcing material is set on the facing material, thereafter a molding material being fed onto the fiber reinforcing material. Then, an upper mold element (upper die) is closed. The concave section is molded on the back side of the foam base material at the convex section by the mold projecting section which is formed on the upper mold element at a corresponding location to the convex section and forces the fiber reinforcing material toward the facing material during a molding process.

DESCRIPTION OF THE PREFERRED EMBODIMENT

The embodiment of the invention will be described with reference to the accompanying drawings.

FIRST EMBODIMENT

Figure 1:
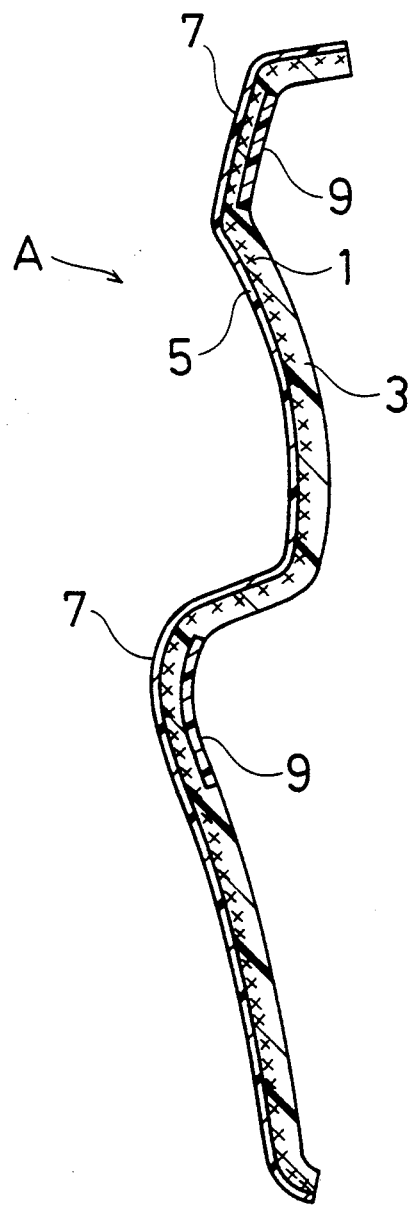
FIG. 1 is a longitudinal sectional side view of a door trim of a first embodiment of the invention.
Figure 2:
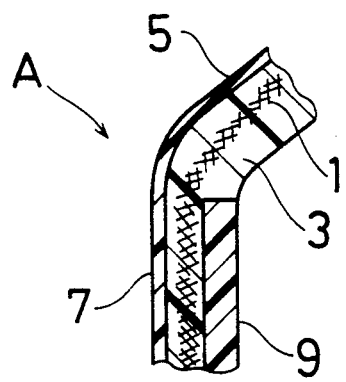
FIG. 2 is a longitudinal sectional enlarged side view of a convex section of the door trim of the first embodiment.
Figure 3:
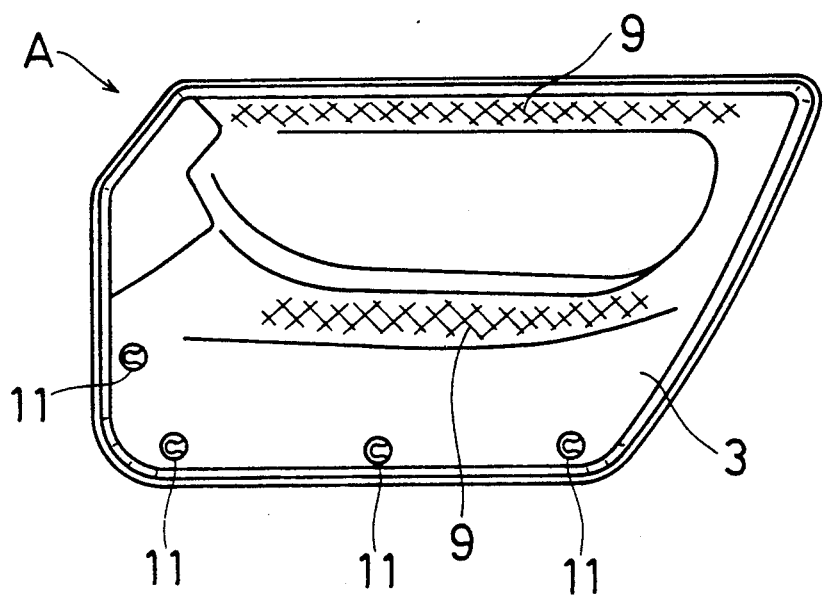
FIG. 3 is a rear view of the door trim of the first embodiment.

FIGS. 1 to 3 depict an interior finishing panel for a vehicle in the form of a door trim A in accordance with the first embodiment of the invention. The door trim A is so constructed that a foam base material 3, which is made of a hard urethane foam or the like and into which a mat-shaped fiber reinforcing material 1 of a glass fiber or the like is inserted, is molded integrally on the back side of a facing material 5 of a polyvinyl chloride or the like.

The door trim A has two convex sections 7 in the vicinity of an upper end and in the middle in relation to a longitudinal direction thereof, respectively. Besides, as one of characteristic features of the invention, a porous sheet material 9, which forces the fiber reinforcing material 1 set in a lower mold element b1 (shown in FIG. 4) of a mold B toward the facing material 5 when an upper mold element b3 is closed, is inserted integrally into the back side of the foam base material 3 at each convex section 7. The porous sheet material 9 is composed of fiber glass, synthetic fiber or other porous foam materials and has permeability. And a corresponding portion of the fiber reinforcing material 1 to the convex section 7 is pushed and pressed by the porous sheet material 9 so that the corresponding portion of the fiber reinforcing material 1 is forced toward the facing material 5, and in the event of the presence of air entrapped between the fiber reinforcing material 1 and the facing material 5, the air is released into the inside of the porous sheet material 9 in order that the occurrence of voids between the fiber reinforcing material 1 and the facing material 5 is avoided. In FIG. 3, the reference numeral 11 denotes a fastener mounting boss for attaching the door trim A to a door inner panel (not shown).

Figure 4:
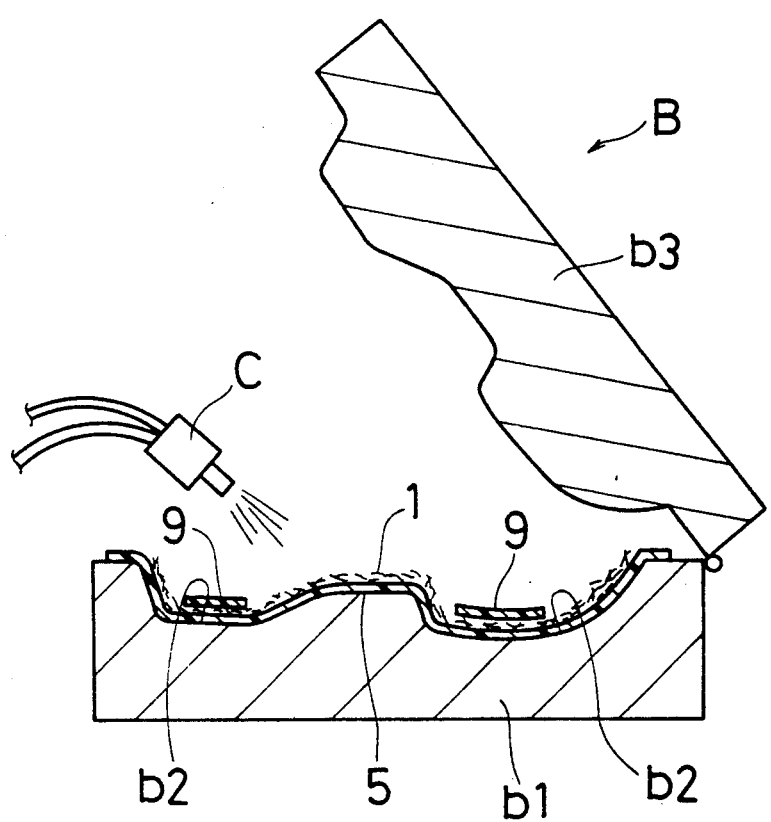
FIG. 4 is a longitudinal sectional view of a mold for the purpose of describing a molding process of the door trim of the first invention.

Next, a molding process of the door trim A of the first embodiment will be explained with reference to FIG. 4.

Firstly, with the mold B opened, the facing material 5, which has been pre-molded by means of slash molding or vacuum forming into a given shape, is set in the lower mold element (lower die) b1 with its front side down. Then, the fiber reinforcing material 1 is set on the facing material 5. Further, each porous sheet material 9 is set on the corresponding portion of the fiber reinforcing material 1 to the convex section 7, or on the portion the location of which corresponds to each of two concave sections b2 of the lower mold element b1. Thereafter, a molding material such as hard urethane foam is fed from a material feeding machine C onto the fiber reinforcing material 1 and the porous sheet material 9, then the upper mold element b3 is closed, and the mold B is heated to foam the molding material, thereby the molding material being molded into a given shape. As a result, the door trim A in which the fiber reinforcing material 1 and the porous sheet material 9 are inserted into the foam base material 3 is made and obtained.

With the closing operation of the upper mold element b3, the porous sheet material 9 is pushed and pressed by the upper mold element 3 during a molding process, whereby the corresponding portion of the fiber reinforcing material 1 to the convex section 7 being forced toward the facing material 5. By such a pressing force, lifting of the fiber reinforcing material 1 can be avoided.

Accordingly, the fiber reinforcing material 1 inserted in the foam base material 3 will not be distributed unevenly in a direction away from the facing material 5. To the contrary, the fiber reinforcing material 1 will be, in fact, oriented close to the facing material 5, so that the thickness of resin layers between the facing material 5 and the fiber reinforcing material 1 becomes thinner. Therefore, the occurrence of voids due to air collected during a molding process is prevented, and also expansion and peeling of the facing material 5 will not occur. Besides, even if air is entrapped, it will be released into the inside of the porous sheet material 9, so that the occurrence of voids is avoided. And since the setting of the porous sheet material 9 is only an additional step, this will not prolong molding time much.

SECOND EMBODIMENT

Figure 5:
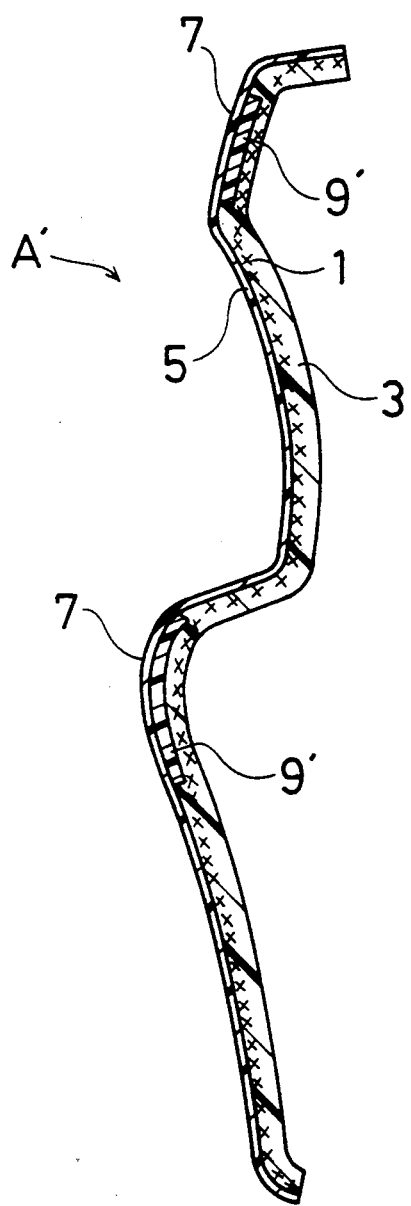
FIG. 5 is a longitudinal sectional side view of a door trim of a second embodiment of the invention.
Figure 6:
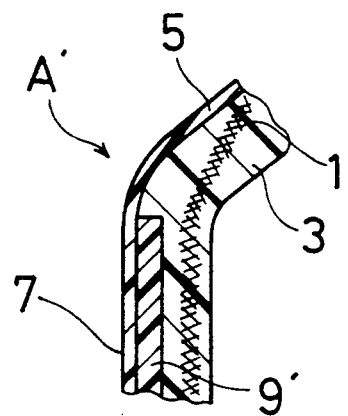
FIG. 6 is a longitudinal sectional enlarged view of a convex section of the door trim of the second embodiment.

FIGS. 5 and 6 show a second embodiment of the invention. In the second embodiment, an impregnated sheet material 9' into which the molding material used for molding the foam base material 3 is impregnated during a molding process is integrally inserted between the facing material 5 and the fiber reinforcing material 5 at each of the convex sections 7. The impregnated sheet material 9' may be made of materials having porosity and high impregnability for liquid such as glass fiber, synthetic resin or other foam materials obtained by processing polyurethane slab under an alkaline treatment to break a cell wall.

Figure 7:
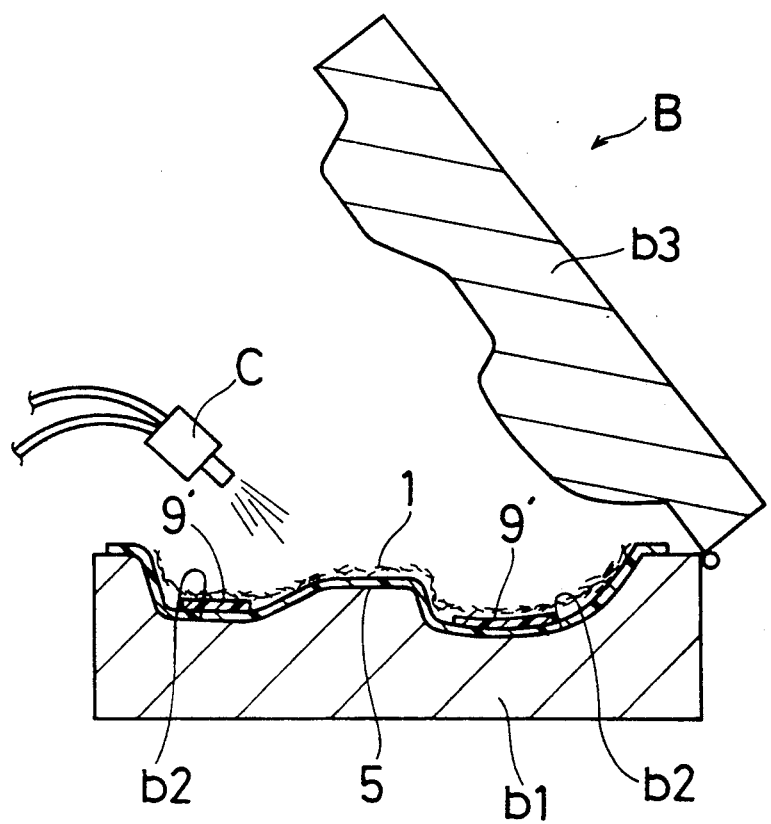
FIG. 7 is a longitudinal sectional view of a mold for the purpose of describing a molding process of the door trim of the second embodiment.
Figure 8:
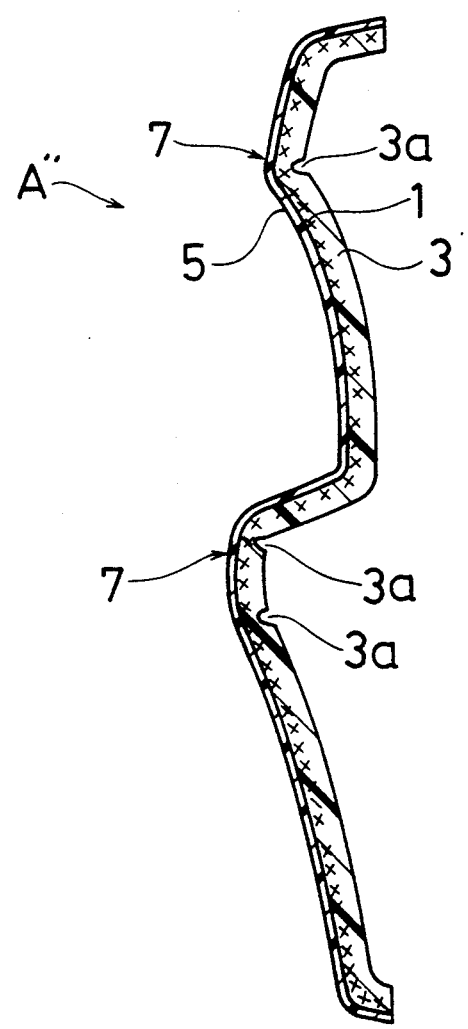
FIG. 8 is a longitudinal sectional side view of a door trim of a third embodiment of the invention.
Figure 9:
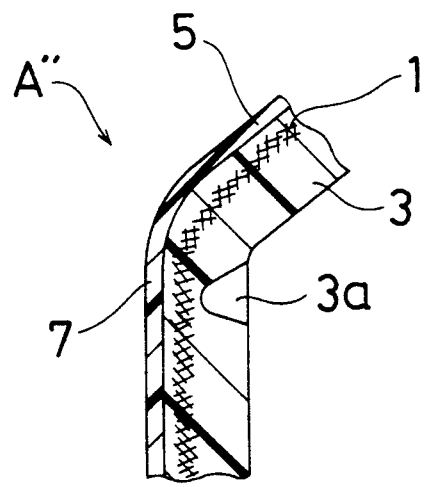
FIG. 9 is a longitudinal sectional enlarged side view of a convex section of the door trim of the third embodiment.
Figure 10:
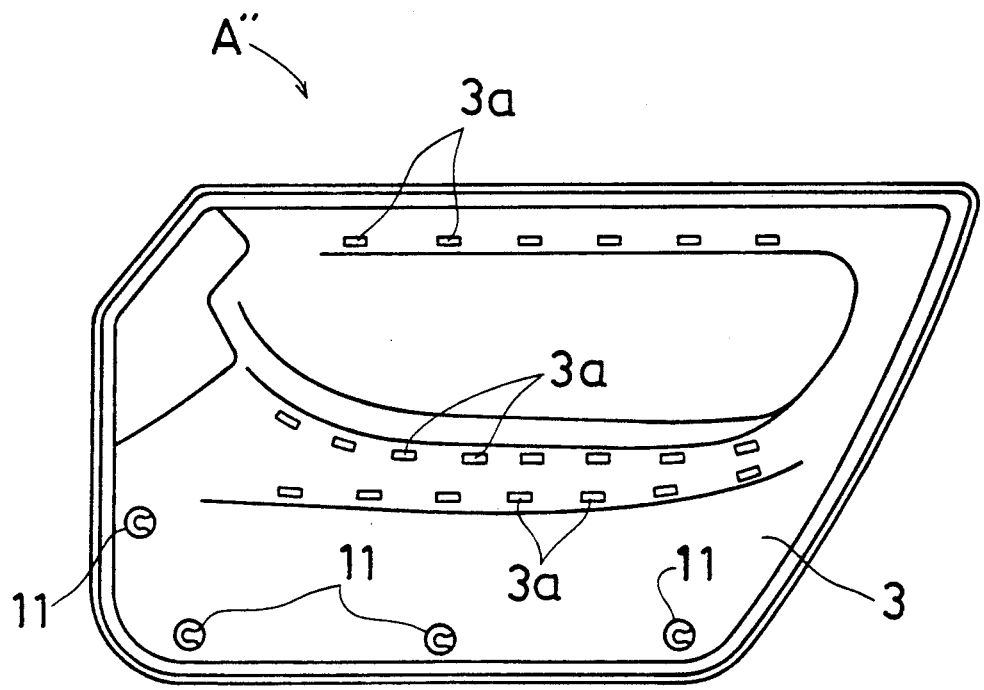
FIG. 10 is a rear view of the door trim of the third embodiment.

As shown in FIG. 7, by setting the impregnated sheet material 9' between the facing material 5 and the fiber reinforcing material 1 at the convex portion 7 in such a manner that the impregnated sheet material 9' is brought in contact with the fiber reinforcing material 1, the molding material used for molding the foam base material 3 is sufficiently impregnated through the fiber reinforcing material 1 into the impregnated sheet material 9' having impregnability, spreading sufficiently between the facing material 5 and the fiber reinforcing material 1. This positively prevents a void from occurring.

When the upper mold element b3 is closed, the fiber reinforcing material 1 is put under tension by the molding surface of the upper mold element b3 and changes its orientation to the one as shown in FIG. 6. In other words, the fiber reinforcing material 1 no longer contacts with the impregnated sheet material 9', and with such a condition the molding material will foam and then cure.

Apart from the above, the second embodiment is similar to the first one, therefore the common elements are represented by the same reference numerals, and the detailed description for each of the elements is omitted.

Now referring to FIG. 7, a molding process of the door trim A' of the second embodiment will be described.

First, with the mold B opened, the facing material 5, which has been pre-molded by slash molding or vacuum forming into a given shape, is set in the lower mold element b1 with its front side down. Next, the impregnated sheet material 9' is set on the back side portion of the facing material 5 corresponding to the convex section 7, or on the portion the location of which corresponds to each of the two concave section b2 of the lower mold element b1. Then, the fiber reinforcing material 1 is set on the facing material 5 and the impregnated sheet material 9'. Thereafter, the molding material such as hard urethane foam is fed from the material feeding machine C onto the fiber reinforcing material 1, then the upper mold element b3 is closed, and the mold B is heated to foam the molding material to mold it into a given shape. As a result, the door trim A' in which the fiber reinforcing material 1 and the impregnated sheet material 9' are inserted into the foam base material 3 is made and obtained.

It is true that with the closing of the upper mold element b3 the portion of the fiber reinforcing material 1 the location of which corresponds to the convex portion 7 will lift from the facing material 5 and therefore be unevenly distributed in a direction away from the facing material 5 during a molding process. However, because of the presence of the impregnated sheet material 9' set between the facing material 5 and the fiber reinforcing material 1, the molding material fed onto the fiber reinforcing material 1 is positively absorbed so that the molding material is sufficiently supplied between the facing material 5 and the fiber reinforcing material 1. The occurrence of voids caused by air collected during a molding process is avoided, and also expansion and peeling of the facing material 5 will not occur, accordingly. And since the setting of the impregnated sheet material is only an additional producing step, this will not prolong molding time much.

THIRD EMBODIMENT

FIGS. 8 to 11 show a third embodiment of the invention. In this embodiment, a plurality of concave sections 3a are molded by a plurality of mold projecting sections b4 of the mold B on the back side of the foam base material 3 at the two convex sections 7 at determined spaced intervals along each of the convex sections 7. When these concave sections 3a are molded, or during a molding process, these mold projecting sections b4, formed on the upper mold element b3 of the mold B, forces the fiber reinforcing material 1 set in the lower mold element b1 toward the facing material 5.

Because of this forcing action, the fiber reinforcing material 1 is forced toward the facing material 5, resulting in the decrease of the volume between the facing material 5 and the fiber reinforcing material 1 at each convex section 7. Accordingly, the molding material is supplied sufficiently between the facing material 5 and the fiber reinforcing material 1. Thus, the occurrence of voids can be avoided without fail.

Apart from the above, the third embodiment is similar to the first one, therefore, the common elements are represented by the same reference numerals. The detailed description of each of these elements is omitted.

Figure 11:
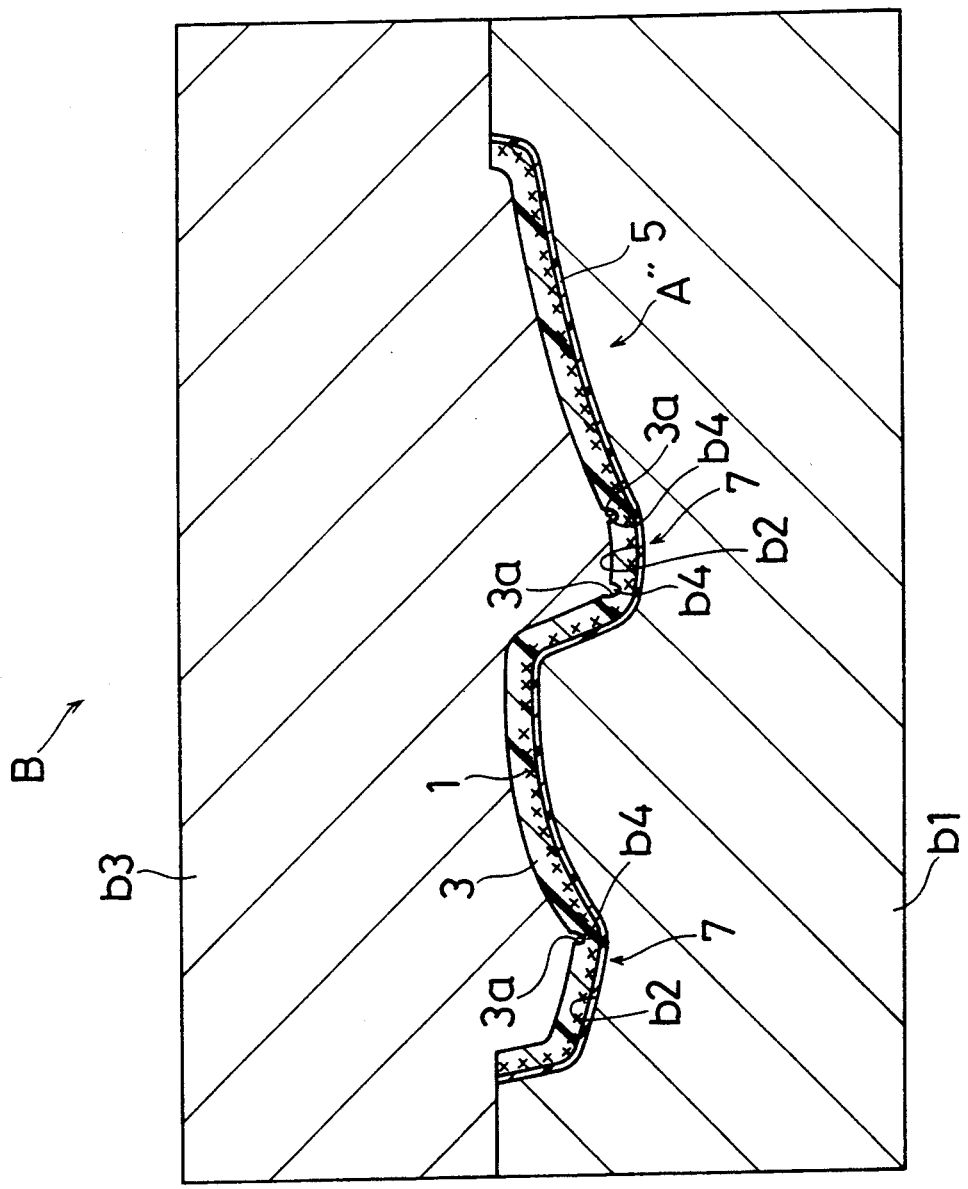
FIG. 11 is a longitudinal sectional view of a mold for the purpose of describing a molding process of the door trim of the third embodiment.
Figure 12:
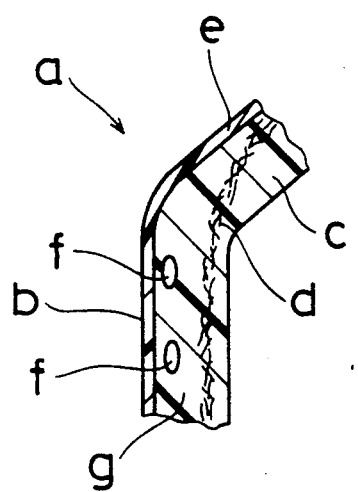
FIG. 12 is a longitudinal sectional enlarged side view of a convex section of a conventional door trim.

Next, a molding process of a door trim A" of the third embodiment will be described with reference to FIG. 11.

First, with the mold B opened, the facing material 5, which has been pre-molded into a given shape by slash molding or vacuum forming, is set in the lower mold element b1 with its front side down. Next, the fiber reinforcing material 1 is set on the facing material 5. Thereafter, the molding material such as hard urethane foam is fed from the material feeding machine (not shown) onto the fiber reinforcing material 1, then the upper mold element b3 is closed, and the mold B is heated to foam the molding material, thereby the molding material being molded into a given shape. As a result, the door trim A" in which the fiber reinforcing material 1 is inserted into the foam base material 3 is made and obtained. In the door trim A" thus made, the concave sections 3a are molded on the back side of the foam base material 3 at each of the convex sections 7 of the door trim A".

With the closing operation of the upper mold element b3, the corresponding portion of the fiber reinforcing material 1 to the convex section 7 is forced toward the facing material 5 by each mold projecting section b4 formed on the upper mold element b3, and because of such a pressing force, lifting of the fiber reinforcing material 1 is prevented. Accordingly, the fiber reinforcing material 1 inserted into the foam base material 3 will not be distributed unevenly in a direction away from the facing material 5. To the contrary, the fiber reinforcing material will be, in fact, oriented close to the facing material 5, so that the thickness of resin layers between the facing material 5 and the fiber reinforcing material 1 becomes thinner. The occurrence of voids caused by air collected during a molding process is avoided, and also expansion and peeling of the facing material 5 can be prevented. Besides, since only the formation of the mold projecting section b4 on the upper element b3 is required, there is no need to set the porous sheet material 9 or the impregnated sheet material 9'. As a result, molding time required for the third embodiment can be shortened compared with the first and second embodiments.

In each of the above-described embodiments, the interior finishing panel according to the invention is the door panel A, A' or A" as the examples of the disclosure of the invention. It is however to be understood that the interior finishing panel of the invention may be used for instrument panels or the like for vehicles.

We claim:

1. An interior finishing panel with a convex section used for a vehicle which comprises a foam base material, a mat-shaped fiber reinforcing material and a facing material, said mat-shaped fiber reinforcing material being inserted into said foam base material which is molded integrally on a back side of said facing material,
   wherein a porous sheet material, which forces said fiber reinforcing material set in a mold toward said facing material during a molding process, is inserted integrally into a back side of said foam base material at said convex section.

2. An interior finishing panel with a convex section used for a vehicle which comprises a foam base material, a mat-shaped fiber reinforcing material and a facing material, said mat-shaped fiber reinforcing material being inserted into said foam base material which is molded integrally on a back side of said facing material,
   wherein an impregnated sheet material, into which a molding material used for molding said foam base material is impregnated during a molding process, is inserted integrally between said facing material and said fiber reinforcing material at said convex section.

3. An interior finishing panel with a convex section used for a vehicle which comprises a foam base material, a mat-shaped fiber reinforcing material and a facing material, said mat-shaped fiber reinforcing material being inserted into said foam base material which is molded integrally on a back side of said facing material, wherein a concave section is molded on a back side of said foam base material at said convex section by a mold projecting section which forces said fiber reinforcing material set in a mold toward said facing material during a molding process.

4. The interior finishing panel for a vehicle as defined in claim 3, wherein there are molded a plurality of concave sections on the back side of said foam base material at determined spaced intervals along said convex section.

5. A method for making an interior finishing panel with a convex section used for a vehicle, said panel comprising a foam base material, a mat-shaped fiber reinforcing material and a facing material in which said mat-shaped fiber reinforcing material is inserted into said foam base material which is molded integrally on a back side of said facing material, the method comprising the steps of:
setting said facing material previously molded on a molding surface of a lower mold element;
setting said fiber reinforcing material on said facing material;
feeding a molding material onto said fiber reinforcing material; and
closing an upper mold element to mold a concave section on the back side of said foam base material at said convex section by a mold projecting section which is formed on the upper mold element at a corresponding location to said convex section and forces said fiber reinforcing material toward said facing material.

* * * * *